United States Patent Office 2,992,379
Patented July 11, 1961

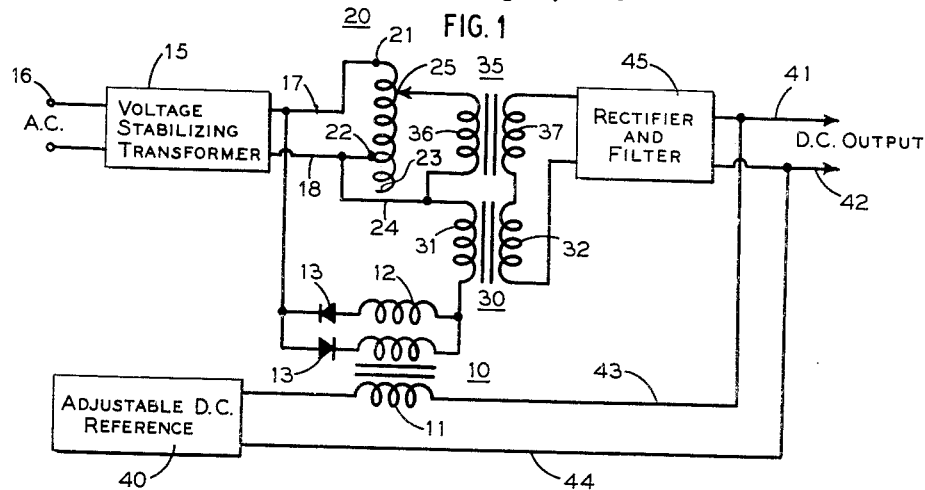
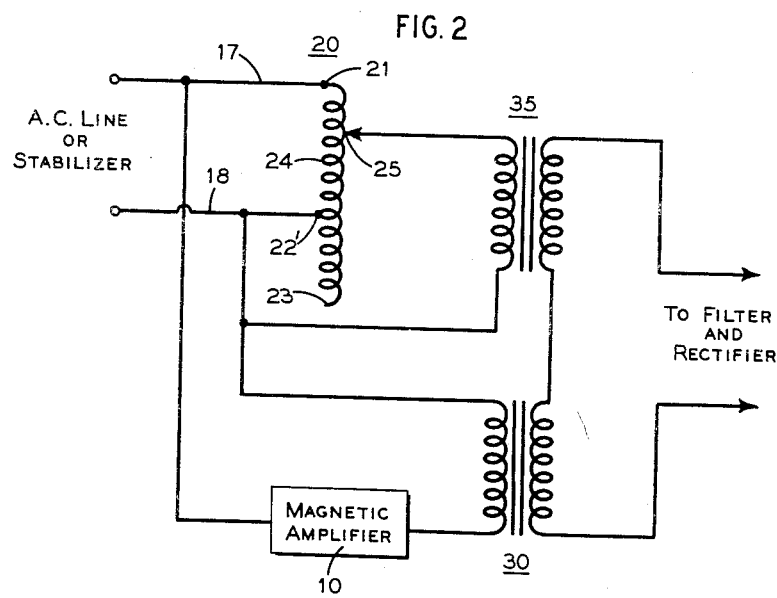

2,992,379
POWER SUPPLY HAVING AN EXTENDED REGULATION RANGE
Arthur Rosin, Flushing, N.Y., assignor to Forbro Design Inc., New York, N.Y., a corporation of New York
Filed Aug. 1, 1958, Ser. No. 752,502
4 Claims. (Cl. 321—18)

This invention relates to regulated direct current power supplies and, more particularly, to an improved power supply of this type having a more extended range of regulation with a limit, in one direction of adjustment, approaching or equalling zero.

A known form of power supply includes, as the voltage adjusting element, a magnetic amplifier connected in series between an incoming power line, or power input, and a transformer which changes the voltage to the desired value. The output voltage of the transformer is rectified and filtered, with the resultant D.C. output voltage being compared with a reference voltage. An error signal, which is the difference between the D.C. voltage and the reference voltage, is applied to the control coil of the magnetic amplifier to control the A.C. voltage applied to the transformer, and thus to cause the D.C. voltage to be maintained at a fixed relation to the reference voltage. As a result, the D.C. output voltage is independent of line voltage fluctuations or voltage variations due to changes in load.

It is frequently desirable that the regulated D.C. output voltage be adjustable in value, and this can be effected by making the reference voltage adjustable, as the output voltage is automatically adjusted to the value of the reference voltage. However, the adjustment in a power supply of this type is limited due to the limited range of control of the magnetic amplifier. Although many expedients, such as adjusting the bias to shift the operating range, have been tried, it has not been possible to obtain a full range of voltage adjustment from zero to its maximum with loads varying from zero to maximum. Furthermore, if the amplification ratio of the system is increased to obtain closer regulation of the output voltage, the amplitude of the error signal that can be applied, without driving the magnetic amplifier out of control, is substantially decreased.

One expedient for increasing the range of adjustment of the output voltage of this type of power supply has been the interposition of a voltage stabilizing transformer between the input power line and the power supply. This voltage stabilizing transformer improves transient response to line voltage changes, provides constant input voltage to the power supply, and compensates to some extent for load changes. While more of the magnetic amplifier range is thus available for controlling the range of output adjustment and for closeness of regulation, the overall output voltage adjustment range is still limited to less than that desirable for many purposes.

A further commonly used expedient employs the foregoing arrangement to provide a minimum and corrective voltage, but the main power supply is provided by an additional transformer connected to the input power line through an adjustable auto-transformer. The secondary winding of this additional transformer is connected in series with the secondary winding of the transformer supplied by the magnetic amplifier in such manner that the two secondary voltages are additive. The combined output is then rectified and filtered in the usual manner. By mechanically coupling the control element of the auto-transformer with that of the reference voltage, a considerable increase in the range of adjustment of the output voltage is obtained. The value of voltage supplied by the corrective transformer is determined by the value of the corrective voltage required at maximum output voltage and, once this value is determined, the minimum output voltage that can be obtained is fixed.

In accordance with the present invention, full range adjustment of the output voltage from zero to maximum is obtained by modifying the immediately foregoing type of system in such a manner that, at the maximum adjustment of the auto-transformer, the additional transformer and the corrective transformer output voltages are additive and at their maximum values; at an intermediate adjustment of the auto-transformer, the output voltage of the additional transformer is zero and the output voltage of the power supply is equal only to that of the corrective transformer; and, at adjustments of the auto-transformer below such intermediate adjustment, the outputs of the additional and the corrective transformers are in opposition so that the output voltage of the power supply is equal to the difference of the output voltages of the additional and the corrective transformers.

For an understanding of the invention principles, reference is made to the following description of a typical embodiment thereof as illustrated in the accompanying drawing. In the drawing:

FIG. 1 is a schematic wiring diagram of a magnetic amplifier type of adjustable D.C. power supply known to the prior art; and FIG. 2 is a partial schematic wiring diagram of the power supply of FIG. 1 modified to obtain full range adjustment of the output voltage in accordance with the present invention.

Referring to FIG. 1, a known magnetic amplifier type of power supply is illustrated as comprising a magnetic amplifier 10, a voltage stabilizing transformer 15, an auto-transformer 20, a corrective transformer 30, an additional transformer 35, an adjustable voltage reference 40, and rectifying and filtering means 45.

The power or line input terminals 16 are connected to the input of voltage stabilizing transformer 15, and conductors 17, 18 apply the output of transformer 15 between terminals 21 and 22 of auto-transformer 20. One terminal of the primary winding 31 of transformer 30 is connected, by a conductor 24, to conductor 18 and thus to terminal 22. The other primary winding terminal is connected, in series with the power coils 12 and diodes 13 of magnetic amplifier 10, to conductor 17.

Similarly, one terminal of primary winding 36 of transformer 35 is connected to adjustable tap 25 of auto-transformer 20 and the other terminal is connected to conductor 24. Secondary windings 32 and 37 are so oriented that their voltages are additive. The output voltage is derived across the two windings 32 and 37 in series and is rectified and filtered by means 45 to provide a D.C. output voltage to conductors 41, 42.

By means of conductors 43, 44, the D.C. output voltage and a D.C. reference voltage from reference 40 are applied to the control coil 11 of amplifier 10. Any difference between these two voltages, as represented by a change in the saturation of coil or winding 11, results in change of the amplification of amplifier 10 in a direction to restore the D.C. output voltage to its pre-set value.

Adjustable tap 25 is connected to the control element of reference 40 so that the output voltage may be adjusted by conjointly adjusting reference 40 and auto-transformer 20. However, while the range of adjustment is increased by this system, it is not possible therewith to adjust the output voltage over the full range from zero to maximum.

Referring to FIG. 2, such full range adjustment is accomplished in the following manner. Fixed tap 22' is so selected that it is substantially closer to terminal 21 than terminal 22 of FIG. 1 is to terminal 21. For full adjustment through zero output voltage, tap 22' should be so located that it divides auto-transformer winding 24 in substantially the same ratio as the output voltage of transformer 35 bears to that of transformer 30.

Windings 32 and 37 are so connected in series that the regulated output voltage is a maximum when slider tap 25 is at terminal 21 of winding 24. As slider 25 is moved toward terminal 23, the output voltage decreases. When slider 25 is exactly opposite tap 22', there is no output voltage from transformer 35 and the output voltage is developed solely from transformer 30.

When slider 25 is moved beyond tap 22' toward terminal 23, a voltage again appears across the secondary winding 37 of transformer 35. However, the input connections to transformer 35 are now, in effect, reversed. Hence, the output voltage of transformer 35 now bucks that of transformer 30 so that the net output voltage is the difference between the output voltages of transformers 35 and 30.

When the reference voltage is reduced to zero, the set output voltage from the opposed transformers is sufficiently low so that the magnetic amplifier action will enable the D.C. output voltage to adjust to the reference voltage. This will approach zero, differing from the reference only by the voltage drop across coil 11. In a practical system this drop will represent only a few millivolts.

In the illustrated embodiment of the invention, transformer 30 is so proportioned as to supply the amount of corrective voltage at maximum output voltage, as when slider 25 is at terminal 21. By proper location of tap 22', the rectified output voltage will follow the reference voltage toward zero as slider 25 is moved toward terminal 23.

While a specific embodiment of the invention has been shown and described in detail to illustrate the application of the invention principles, it will be understood that the invention may be embodied otherwise without departing from such principles.

What is claimed is:

1. A magnetic amplifier controlled power supply capable of adjustment of the output voltage from a value equal to the input voltage to substantially zero, said power supply comprising, in combination, a pair of input terminals arranged to have the input voltage applied thereto; an autotransformer including a winding having first and second terminals and a contact adjustable along said winding between said terminals; means connecting one of said input terminals to said first terminal; means connecting the other input terminal to a fixed tap on said winding spaced from said first and second terminals; a pair of transformers; means connecting the primary winding of one transformer across said input terminals; means connecting the primary winding of said other transformer between said adjustable contact and said tap; a pair of output terminals; and means connecting the secondary windings of said transformers in additive relation across said output terminals; whereby the secondary voltage of said other transformer, when said adjustable contact is between said tap and said first terminal, is proportional to the distance of said adjustable contact from said tap and augments the secondary voltage of said one transformer, the secondary voltage of said other transformer, when said adjustable contact is aligned with said tap, is zero, and the secondary voltage of said other transformer opposes the secondary voltage of said one transformer when said adjustable contact is moved from said tap toward said second terminal; the distance between said tap and said second terminal being such that, when said adjustable contact engages said second terminal, the two secondary voltages are opposite and substantially equal.

2. A magnetic amplifier controlled power supply capable of adjustment of the output voltage from a value equal to the input voltage to substantially zero, said power supply comprising, in combination, a pair of input terminals arranged to have the input voltage applied thereto; an autotransformer including a winding having first and second terminals and a contact adjustable along said winding between said terminals; means connecting one of said input terminals to said first terminal; means connecting the other input terminal to a fixed tap on said winding spaced from said first and second terminals; a control transformer having its primary winding connected across said input terminals in series with a control magnetic amplifier; an auxiliary transformer having its primary winding connected between said tap and said adjustable contact; a pair of output terminals; and means connecting the secondary windings of said transformers in series additive relation across said output terminals.

3. A magnetic amplifier controlled power supply capable of adjustment of the output voltage from a value equal to the input voltage to substantially zero, said power supply comprising, in combination, a pair of input terminals arranged to have the input voltage applied thereto; an autotransformer including a winding having first and second terminals and a contact adjustable along said winding between said terminals; means connecting one of said input terminals to said first terminal; means connecting the other input terminal to a fixed tap on said winding spaced from said first and second terminals; a control transformer having its primary winding connected across said input terminals in series with a control magnetic amplifier for providing a secondary voltage controlled between predetermined maximum and minimum values; an auxiliary transformer having its primary winding connected between said tap and said adjustable contact; a pair of output terminals; and means connecting the secondary windings of said transformers in additive relation across said output terminals; whereby the secondary voltage of said other transformer, when said adjustable contact is between said tap and said first terminal, is proportional to the distance of said adjustable contact from said tap and augments the secondary voltage of said one transformer, the secondary voltage of said auxiliary transformer, when said adjustable contact is aligned with said tap, is zero, and the secondary voltage of said auxiliary transformer opposes the secondary voltage of said control transformer when said adjustable contact is moved from said tap toward said second terminal; the distance between said tap and said second terminal being such that, when said adjustable contact engages said second terminal, the two secondary voltages are opposite and substantially equal wherein the resultant voltage comprising said minimum secondary voltage of said controlled transformer and said opposing voltage from said auxiliary transformer is adjustable to substantially zero.

4. A magnetic amplifier controlled power supply capable of adjustment of the output voltage from a value equal to the input voltage to substantially zero, said power supply comprising, in combination, a pair of input terminals arranged to have the input voltage applied thereto; an auto-transformer including a winding having first and second terminals and a contact adjustable along said winding between said terminals; means connecting one of said input terminals to said first terminal; means connecting the other input terminal to a fixed tap on said winding spaced from said first and second terminals; a control transformer having its primary winding connected across said input terminals in series with a control magnetic amplifier; an auxiliary transformer having its primary winding connected between said first terminal and said adjustable contact; a pair of output terminals; and means connecting the secondary windings of said transformers in additive relation across said output terminals; the distance of said tap from said first terminal being such that the voltage developed by the secondary winding of said auxiliary transformer, when said adjustable contact is aligned with said tap, is zero, the secondary voltage of said auxiliary transformer opposing the secondary voltage of said control transformer when said adjustable contact is moved from said tap toward said second terminal, a rectifier and direct current filter connected across said output terminals and a feedback connection between said filter output and said magnetic amplifier to provide a regulated direct current voltage from said filter adjustable from a predetermined maximum voltage to substantially zero voltage.

References Cited in the file of this patent

UNITED STATES PATENTS

| | | |
|---|---|---|
| 1,916,072 | Rankin | June 27, 1933 |
| 2,830,255 | De Blasio | Apr. 8, 1958 |
| 2,868,998 | Stenkvist | Jan. 13, 1959 |
| 2,895,563 | Wintermute | July 21, 1959 |